June 22, 1965   P. C. SUDRES   3,190,397
BRAKE SHOE INCLUDING A WEAR-INDICATING MEANS
Filed Feb. 13, 1963   2 Sheets-Sheet 1

INVENTOR
PIERRE CAMILLE SUDRES
BY Irwin S. Thompson
ATTY.

June 22, 1965  P. C. SUDRES  3,190,397
BRAKE SHOE INCLUDING A WEAR-INDICATING MEANS
Filed Feb. 13, 1963  2 Sheets-Sheet 2
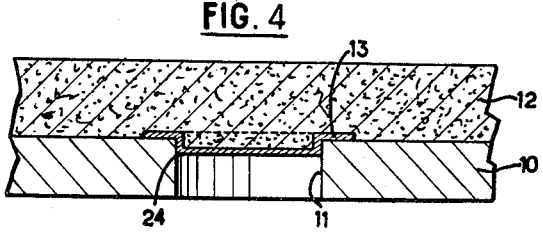
FIG. 4
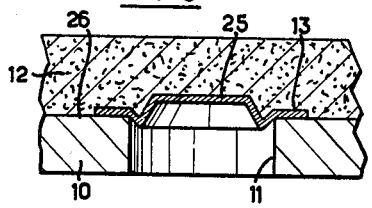 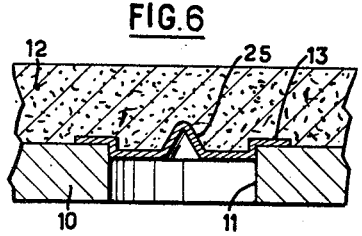
FIG. 5  FIG. 6
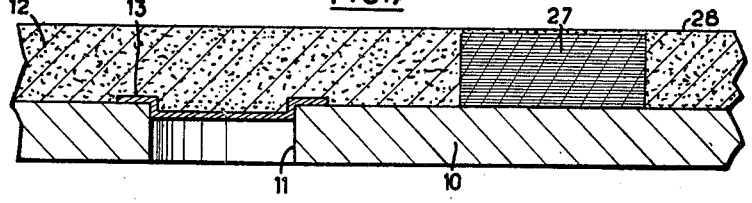
FIG. 7
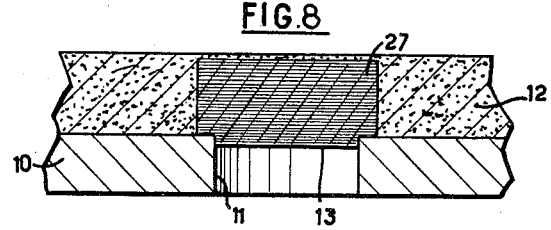
FIG. 8
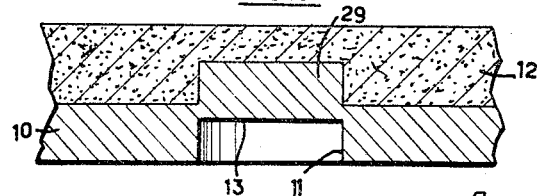
FIG. 9
INVENTOR
PIERRE CAMILLE SUDRES
By Irwin S. Thompson
ATTY.

United States Patent Office 3,190,397
Patented June 22, 1965

3,190,397
BRAKE SHOE INCLUDING A WEAR-INDICATING MEANS
Pierre Camille Sudres, Paris, France, assignor to Societe Anonyme Francaise du Ferodo, Paris, France, a corporation of France
Filed Feb. 13, 1963, Ser. No. 258,251
Claims priority, application France, Feb. 16, 1962, 888,251
1 Claim. (Cl. 188—1)

The present invention relates to a shoe for a disc-brake, comprising a support, for example of metal, provided on one side with at least one hole for fixing the shoes to a device such as an actuating, fixing or guiding device, and lined on the other side with a friction lining.

One of the objects of the invention is a shoe of this type, particularly characterized in that the fixing hole passes right through the support, while a shield is interposed between the support and the lining, at the position of the said hole, so as to form the bottom of the hole.

By virtue of this arrangement, during the course of manufacture, the shield prevents the lining material from passing into the fixing hole, so that the surface of the hole is perfectly clean in all its parts, permitting perfect engagement with the actuating, fixing or guiding device.

In one form of embodiment, the shield consists of a flat plate, while in an alternative form it consists of a plate having one or more projections formed on the side opposite to the lining and engaging in the hole, especially for the purpose of positioning the said plate.

In accordance with a further characteristic feature of the invention, elements are incorporated in the lining, either to produce a squeak which warns that it is necessary to replace the shoe by a new one, or to improve the frictional qualities of the lining. These elements may be formed, wholly or in part, by the shield.

The present invention has also for its object a method of manufacture of a shoe for a disc brake, this method being particularly characterized in that the support is placed in the bottom of a moulding matrix, a shield being placed on the support over the position of the fixing hole and so as to cover this hole, (and eventually blocks of friction material such as graphite studs) a mass of friction material, deformable when hot, is placed over the support and the shield, and this mass is compressed with a press, the material filling all the hollows existing, until the matrix is full to the edge so as to form the lining, to the exclusing of the fixing hole, the internal space of which is protected by the shield, so that the surface of the hole is perfectly clean and free from dirt.

The present invention has also for its object a mould for carrying the foregoing method into effect, characterized in that it comprises a matrix bottom provided with a centering projection for the fixing hole of the support, on which the shield may be carried, a press which can be brought up under pressure to the matrix, and means for heating the mould.

The objects, characteristic features and advantages of the invention will furthermore be brought out in the description which follows below, by way of example, reference being made to the accompanying dawings, in which.

FIGS. 4, 5, 6, 7, 8 and 9 relate to various alternative forms.

Figure 1:
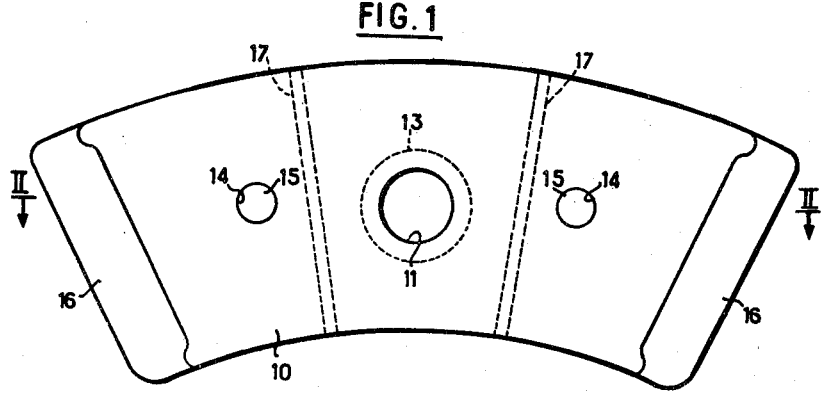
FIG. 1 is a view in elevation of a shoe according to the invention.
Figure 2:
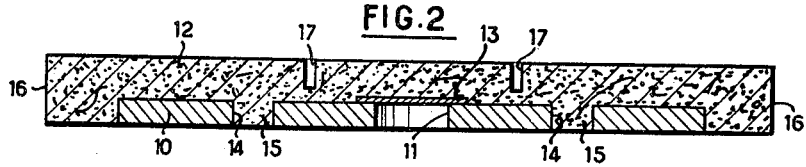
FIG. 2 is a corresponding view in cross-section taken along the line II—II of FIG. 1.
Figure 3:
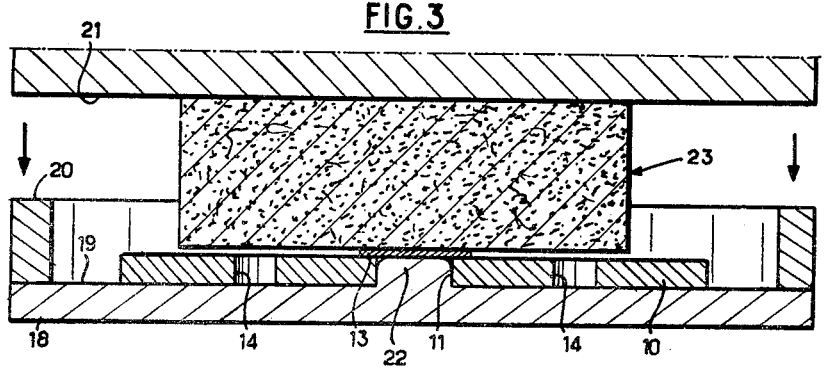
FIG. 3 illustrates a method of manufacture of the shoe.

In the form of embodiment shown in FIGS. 1 to 3, a shoe for a disc-brake (FIGS. 1 and 2) is composed of a metallic support 10 which is provided on one side with at least one hole 11 for fixing the shoe to an actuating, fixing or guiding device (not shown). The support 10 is covered on the other side with a friction lining 12.

The hole 11 passes right through the support 10, while a shield 13 is interposed between the support 10 and the lining 12, above the hole 11, so as to form the bottom of this hole. In the example shown in FIGS. 1 and 2, the shield 13 consists of a flat plate. Anchorage holes 14, additional to the fixing hole 11, are formed in the support 10 and have no shield 13. These holes 14 are filled at 15 with the material of the lining 12.

As can be seen from FIGS. 1 and 2, the perimeter of the lining 12 extends beyond that of the support 10, especially on the sides at 16. The thickness of the lining 12 at the position of the extensions 16 is increased by the thickness of the support 10.

One or a number of slots 17 are formed in the lining 12, and have a depth less than the thickness of the lining 12. Each slot 17 preferably extends transversely to the direction of slip of the shoe.

In order to manufacture a shoe such as that represented in FIGS. 1 and 2, there is employed (FIG. 3) a moulding matrix 18 provided with a base 19 and a peripheral edge 20. With the matrix 18 co-operates a press-plate 21 which is intended to be brought up to the matrix 18 until it makes contact with the edge 20.

The mould assembly formed by the matrix 18 and the press-plate 21 comprises a heating means for raising the temperature to a value of the order of 100 to 300° C.

In the example shown in FIG. 3, the bottom 19 of the moulding matrix 18 comprises a centering boss 22 which is intended to engage in the hole 11 in order to position the support 10. In addition, the contour of the matrix 18 is such that it corresponds to that of the shoe, including the side extensions 16.

In order to manufacture the shoe, the support 10 is placed flat on the bottom 19 of the matrix 18, the hole 11 being engaged on the boss 22. In the example shown in FIG. 3, this boss 22 has a height equal to the thickness of the support 10. When so required, an adhesive may be spread over the support 10 in order to improve the fixing of the lining on the support.

The plate 13 is placed on the support 10 so as to cover the hole 11. A shield 13 of this kind can be supported on the boss 22 while being retained in position by the adhesive. As an alternative, the plate could first be placed in position and the adhesive is then applied over the whole unit. In this case in particular, the plate can be held in position if necessary by any other appropriate means apart from the adhesive referred to above, for example by magnetic effect.

There is then placed on the support 10 and the shield 13 a mass 23 of friction material which is deformable when hot. This mass can be advantageously constituted by a material of compressed powder comprising for example asbestos, thermo-hardening resins and metallic or mineral fillers.

The mass 23 is compressed by the press plate 21 until the plate 21 comes into contact with the edge 20. During the course of this compression, the material fills all the hollows which are available until the matrix 18 is full up to the edge so as to form the lining, to the exclusion however of the hole 11, the freedom and cleanliness of which are protected by the shield 13.

For a moulding operation of this kind, the mould is heated to a temperature of 100 to 300° C., and the compression is effected at a pressure of 100 to 800 kg./sq. cm.

Before de-moulding, the product is baked at the above-specified temperature for a period of 2 to 10 minutes. After de-moulding, there is obtained a shoe such as shown in FIGS. 1 and 2, with a lining 12 securely fixed to the support 10, with extension edges 16 and anchorage studs 15, while the fixing hole 11 is left perfectly clean for the purpose of its engagement with the operating device.

Reference will now be made to FIG. 4, in which the arrangement is similar to that which has just been described with reference to FIGS. 1 to 3, but in which the plate 13 is provided with a rebate 24 which is intended to engage in the hole 11 so as to position the plate 13.

This rebate 24 could be replaced by one or a number of projections engaging in the hole 11.

In a further alternative (FIG. 5), the shield 13 comprises one or a number of projections 25 which pass beyond the surface 26 of the support 10 on which the lining is applied. The projection or boss 25 which is embedded in the lining 12 becomes exposed when this lining is worn down. It then causes a squeaking noise which warns the user of the necessity of having the lining replaced.

In FIG. 5, the boss has the form of an inverted bowl extending over almost the whole of the surface of the shield 13. In the alternative shown in FIG. 6, the boss 25 has the shape of a cone occupying only the central portion of the shield 13.

It should be noted that the safety bosses 25 could be constituted by members independent of the shield 13, instead of being arranged above the hole 11 in order to form the shield 13. Furthermore, a number of warning bosses 25 could be provided, one forming the shield 13 and others being independent of the shield 13.

Reference will now be made to FIG. 7, in which the hole 11 of the support 10 is provided with a shield 13, and in which a plug 27 of material with a different coefficient of friction from that which constitutes the lining 12, for example of graphite, is incorporated in the said lining and comes level or almost level with the friction surface 28 in the new state.

In the example shown in FIG. 7, the plug 27 is independent of the shield 13. In the alternative form shown in FIG. 8, it is a plug portion 27 which itself forms the shield 13.

In the various forms of embodiment which have been described previously, the shield 13 is constituted by a member separate from the support 10. In the alternative form shown in FIG. 9, the hole 11 is formed by upsetting a portion 29 of the support 10, the said portion 29 forming the shield 13.

The invention is not of course limited to the forms of construction described and shown by way of example, but includes all its alternative forms.

What I claim is:

A brake shoe comprising a support member having a fixing hole extending therethrough, a friction lining on said support member, and a shielding member of a material other than the material of the friction lining disposed against said support member between said friction lining and said support member so as to constitute the bottom of said hole, said shielding member overlying only the marginal edges of said hole and extending outwardly beyond the hole about the periphery of the hole and extending into the friction lining beyond the contour of the support member, the material of said shielding member emitting a squealing sound in use upon exposure thereby to give an audible indication that the brake shoe should be replaced.

References Cited by the Examiner

UNITED STATES PATENTS

| | | | |
|---|---|---|---|
| 1,340,965 | 5/20 | McAllister | 264—264 X |
| 1,557,670 | 10/25 | De France | 18—59 |
| 1,557,671 | 10/25 | De France | 18—59 |
| 1,941,656 | 1/34 | Blume | 188—251 X |
| 2,120,548 | 6/38 | Collier | 188—251 |
| 2,146,357 | 2/39 | Schweikle | 188—1 XR |
| 2,904,138 | 9/59 | Wilson | 188—251 |
| 2,943,713 | 7/60 | Salak et al. | 188—251 |
| 2,994,410 | 8/61 | Burnett | 188—23 |
| 3,056,380 | 10/62 | White | 188—251 |
| 3,077,639 | 2/63 | Siner et al. | 264—263 |

FOREIGN PATENTS

| | | |
|---|---|---|
| 159,976 | 11/54 | Australia. |
| 1,059,532 | 11/53 | France. |
| 1,252,161 | 12/60 | France. |

EUGENE G. BOTZ, *Primary Examiner.*

ARTHUR L. LA POINT, *Examiner.*